(No Model.)
H. G. REINEMER & R. LANG.
THREE HORSE EVENER.
No. 417,091. Patented Dec. 10, 1889.
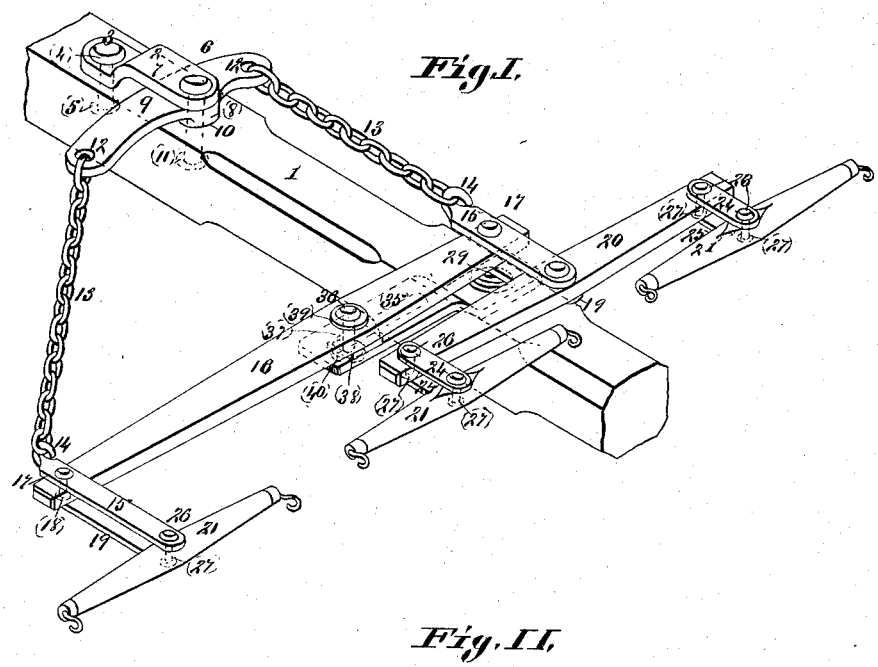
Fig. I.
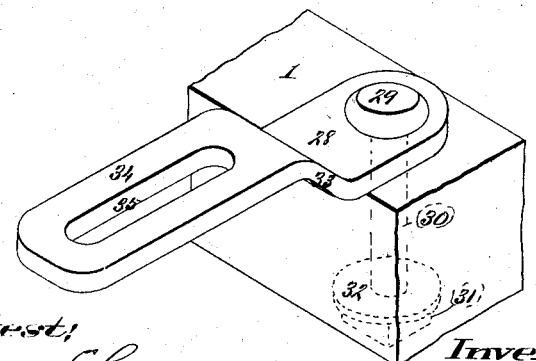
Fig. II.
Attest:
George E. Cruse.
E. Arthur
Inventors,
Henry G. Reinemer,
Robert Lang.
By Knight Bro's.
Atty's

UNITED STATES PATENT OFFICE.

HENRY G. REINEMER AND ROBERT LANG, OF PIERRON, ILLINOIS.

THREE-HORSE EVENER.

SPECIFICATION forming part of Letters Patent No. 417,091, dated December 10, 1889.

Application filed October 21, 1889. Serial No. 327,711. (No model.)

*To all whom it may concern:*

Be it known that we, HENRY G. REINEMER and ROBERT LANG, both of Pierron, in the county of Bond and State of Illinois, have invented a certain new and useful Improvement in Three-Horse Eveners, of which the following is a full, clear, and exact description, reference being had to the accompanying drawings, forming part of this specification.

This invention relates to devices to equalize the center draft at a point remotely back of the whiffletrees and much nearer the load under draft, with a free lateral but vertically-confined movement of the whiffletrees, the draft being centralized at said rear attachment of the draft-bolt; and the invention consists in features of novelty hereinafter fully described, and pointed out in the claims.

Figure I is a detail perspective view of the tongue to which said self-adjusting center draft is attached; and Fig. II is an enlarged detail perspective, and shows the slot-bar that provides a free lateral scope to the side movement of the triple and double trees and the whiffletrees they carry.

Referring to the drawings, 1 represents the draft-tongue, details of which are shown in both the figures.

2 is the surmounting-strap at the rear center-draft attachment, the rear end of which strap is secured to the tongue by the screw-bolt 3, which passes through the bolt-hole 4 in said strap and is seated in the bolt-hole 5 in said tongue. The draft-bolt 6 passes through and is seated in the bolt-hole 7, near the forward end of said strap, through a similar hole 8 in the rear center-draft-equalizing bar 9, through the anti-friction washer 10, that intervenes between said tongue and said equalizing-bar, and through the draft bolt-hole 11 in said tongue.

The equalizing-bar 9 is preferably of steel, but may be of any other suitable material, and the said draft-hole 7, by which it is pierced, is exactly one-third the distance from the stay and draft-chain hole 12 on the doubletree side of the attachment to that also marked 12 at the other end of said equalizing-bar, so as to equalize the draft between the three horses.

13 represents the stay and draft chains that connect the draft, respectively, from the holes at each end of the center-draft-equalizing bar with the draft-hooks 14, whose straps 15 are respectively secured to the two ends of the tripletree 16 by the screw-bolts 17, which bolts pass through the bolt-hole 18 in said straps, through the tripletree, and through the parallel draft-straps 19 beneath said tripletree, the draft-chain from the short end of the equalizing-bar being hitched to the draft-hook on the short end of the tripletree, and that from the long end of the bar being hitched to the draft-hook on the long end of the tripletree. The parallel draft-straps 15 and 19, respectively, are provided with integral extensions, which at the short end of the tripletree embrace the middle of the doubletree 20 respectively above and below, and at the long end of said tripletree embrace the middle of the singletree 21, also above and below, for hitching the third horse. A bolt 22 passes through the holes 23, that register through the middle of the doubletree and through near the forward ends of the draft-straps 15 and 19, that embrace said doubletree.

24 and 25 indicate, respectively, the upper and lower parallel draft-straps that couple the singletrees 21 of the two nigh horses to the doubletree to which they are secured, the said straps being attached to near the ends of said doubletree and to the middle of said singletree, as are also the parallel straps that embrace the singletree of the third horse, by the bolts 26, that pass through the bolt-holes 27 in said respective coupling parts.

The bolts 3, 6, 17, 22, and 26 may be respectively secured and secure the parts that they couple by screw-nuts that are screw-seated on said bolts, or by any other suitable means.

28 represents the slotted guide-bar, that while restraining or holding down the tripletree from vertical displacement, yet allows free vertical movement within certain limits of said tripletree and its draft attachments, so as to self-adjust variations in the side draft incident to the passage of the team and harvester or other machine, &c., over inequalities of the surface of the ground. The fast end of said guide-bar is secured to the tongue by the screw-bolt 29, that passes through and is seated in the bolt-hole 30 near said end of the guide-bar and through said tongue, in which seat it is secured by the screw-nut 31. An anti-friction washer 32 intervenes between said tongue and nut. An inclined surmounting-shoulder 33 on said strap inclines upward from the tongue and then turns back to a horizontal position to form the seat 34, on which the laterally-sliding tripletree works.

35 represents an elongated slot in the said seat of the guide-bar, in which slot works the bolt 36, that is seated in the bolt-hole 37 in said tripletree one-third way from the draft-bolt hole on the nigh end of said tripletree to that of the draft-bolt hole on the off end thereof, so as to equalize the draft between the individual horses that are respectively attached to the doubletree on the nigh side and to the separate singletree on the off side. The said bolt passes through slides within and is limited in its movements by the terminals of said elongated slot in said guide-bar, beneath which bar the bolt is held captive by the screw-nut 38. Anti-friction washers 39 and 40, respectively, intervene between the head of said bolt 36 and tripletree above and between the nut of said bolt and said guide-bar below.

Now it will be seen that the center-draft attachment is made and centralized far to the rear of the whiffletrees, and at said rear attachment there is an equalizing-bar, and that by the use of our slotted guide-bar the triple, double, and single trees are held captive from vertical misadjustment, while they have at the same time within certain necessary limits a free lateral swing, while the team with the harvester or other machine pass over inequalities in the surface of the ground, which elements of the invention are of great advantage in effecting a precision of the work to be accomplished, with a lightness of draft consequent upon the near vicinage of the draft attachment to the load that is drawn. It will also be seen that the free side-play of the whiffletrees within certain limits is attained by the use of the above-described elements of invention, which is of great service to the team itself, especially when working over uneven ground, as that of a harvest-field often presents, where horses frequently lose their foot-hold from the frequent lateral thrusts as the side draft suddenly changes. Not only does the slotted guide-bar, by means of its elongated slot, in which the tripletree-bolt 36 works, both hold the tripletree from vertical misadjustment and provides means for its free lateral self-adjustment within certain limits, but also, as said slotted guide-bar has a pivotal attachment by means of the pivot-bolt 29 to the tongue, the said slotted guide-bar has within certain limits a free self-adjusting pivotal movement that still further aids the self-adjustment of the whiffletrees.

The draft-chains can be adjusted to a diversity of lengths by changing the hitch on the draft-hooks 14 from one link to another on either or both the chains.

Our three-horse evener is attachable and well adapted for the draft not only of harvesters, to which it has been described as especially adapted, but also to all classes of locomotive draft, such as to wagons, rollers, grain-drills, &c.

We claim as our invention—

1. In a three-horse evener, the combination of the tripletree, the slotted guide-bar 28, and the bolt 36, that is seated in said tripletree and works in the slot of said guide-bar to restrain said tripletree from vertical displacement and allow within certain limits free lateral self-adjustment of the same, substantially as and for the purpose set forth.

2. In a three-horse evener, the combination of the tongue 1, the center-draft-equalizing bar 9, the draft-bolt 5, the tripletree, the draft-chains that connect said equalizer to said tripletree, the slotted guide-bar 28, secured to said tongue, and the bolt 36, that is seated in said tripletree and works in the slot of said guide-bar, substantially as and for the purpose set forth.

3. In a three-horse evener, the combination of the center-draft-equalizing-bar 9, the bolted strap that surmounts and holds said equalizing-bar, the tripletree, the draft-chains that hold captive said tripletree to said equalizing-bar, the said chains being adjustable by transference of the hitch-links of the chains, the hooked upper draft-straps bolted to the tripletree to which said chains are hitched, the parallel lower draft-straps, the double and single trees, and the parallel straps that attach said doubletree to its singletrees, the slotted pivoted guide-bar 28, the bolt by which said guide-bar is pivotally secured to the tongue, and the bolt 36, that is seated in said tripletree and works within the slot of said guide-bar, substantially as and for the purpose set forth.

HENRY G. REINEMER.
ROBERT LANG.

In presence of—
BENJN. A. KNIGHT,
E. S. KNIGHT.